(12) United States Patent
Saul et al.

(10) Patent No.: US 12,227,045 B2
(45) Date of Patent: Feb. 18, 2025

(54) TANDEM AXLE TRAILER SUSPENSION SYSTEM

(71) Applicants: Jonathan R. Saul, LaSalle, MI (US); Rollin Saul, LaSalle, MI (US)

(72) Inventors: Jonathan R. Saul, LaSalle, MI (US); Rollin Saul, LaSalle, MI (US)

(73) Assignee: Aulfab, LLC, Toledo, OH (US)

( * ) Notice: Subject to any disclaimer, the term of this patent is extended or adjusted under 35 U.S.C. 154(b) by 0 days.

(21) Appl. No.: 18/218,342

(22) Filed: Jul. 5, 2023

(65) Prior Publication Data
US 2025/0010676 A1    Jan. 9, 2025

(51) Int. Cl.
*B60G 11/04* (2006.01)
*B60G 11/107* (2006.01)
*B60G 11/12* (2006.01)

(52) U.S. Cl.
CPC ............ *B60G 11/04* (2013.01); *B60G 11/107* (2013.01); *B60G 11/12* (2013.01); *B60G 2200/31* (2013.01); *B60G 2202/112* (2013.01); *B60G 2204/121* (2013.01); *B60G 2204/4302* (2013.01); *B60G 2204/4306* (2013.01); *B60G 2300/04* (2013.01)

(58) Field of Classification Search
CPC .............. B60G 2204/121; B60G 11/04; B60G 11/107; B60G 11/12; B60G 2200/31; B60G 2202/112; B60G 2204/4306; B60G 2300/04
See application file for complete search history.

(56) References Cited

U.S. PATENT DOCUMENTS

| | | | | |
|---|---|---|---|---|
| 1,467,035 A | * | 9/1923 | Grundler | B60G 11/04 267/45 |
| 2,047,802 A | * | 7/1936 | Schilde | B60G 11/02 267/47 |
| 3,108,822 A | * | 10/1963 | Tantlinger | B60G 5/047 280/682 |
| 3,186,731 A | * | 6/1965 | Fossard | B60G 5/047 280/682 |

(Continued)

FOREIGN PATENT DOCUMENTS

| | | | | |
|---|---|---|---|---|
| CA | 2220475 A1 | * | 5/1999 | ............. B60G 11/28 |
| CN | 108973570 A | * | 12/2018 | ............. B60G 11/46 |

(Continued)

*Primary Examiner* — Paul N Dickson
*Assistant Examiner* — Matthew D Lee
(74) *Attorney, Agent, or Firm* — Harness, Dickey & Pierce, P.L.C.

(57) ABSTRACT

A trailer including a trailer frame, and a trailer suspension including a first and second suspension assemblies and a pair of axles. Each of the first and second suspension assemblies includes a first spring including first and second spring ends, and a second spring including third and fourth spring ends. The second spring end of the first spring is positioned adjacent to the third spring end of the second spring, and the second and third spring ends are disposed between the first and fourth spring ends. The second spring end is rotatable about a first rotational axis that is fixed relative to the trailer frame. The third spring end is rotatable about a second rotational axis that is fixed relative to the trailer frame. The first spring end and the fourth spring end of the second spring are movable relative to the trailer frame.

20 Claims, 8 Drawing Sheets

(56) References Cited

U.S. PATENT DOCUMENTS

| | | | | |
|---|---|---|---|---|
| 3,361,442 | A | * | 1/1968 | Willetts ................ B60G 11/23 280/682 |
| 3,502,345 | A | * | 3/1970 | Hulverson ............ B62D 53/06 280/682 |
| 3,602,523 | A | * | 8/1971 | Poulos ................ B60G 11/113 280/682 |
| 3,929,347 | A | * | 12/1975 | Masser ................ B60G 11/12 267/52 |
| 3,964,735 | A | * | 6/1976 | Wright .................. B60G 7/00 280/124.17 |
| 4,884,644 | A | * | 12/1989 | Reichow ................ G01G 19/12 177/137 |
| 4,969,529 | A | * | 11/1990 | Reichow ................ G01G 19/12 177/210 R |
| 5,219,151 | A | * | 6/1993 | Stewart ................ B60G 11/107 267/262 |
| 5,234,067 | A | * | 8/1993 | Simard ................ B60G 11/04 280/682 |
| 5,662,314 | A | * | 9/1997 | Stoltzfus ................ B60G 5/00 267/47 |
| 7,249,780 | B1 | | 7/2007 | Wilson et al. |
| 9,261,227 | B2 | * | 2/2016 | Pierce ................ B60T 17/088 |
| 9,821,617 | B1 | * | 11/2017 | Hord ................ B60G 11/34 |
| 10,370,033 | B1 | * | 8/2019 | Klein ................ B62D 21/20 |
| 10,807,428 | B1 | * | 10/2020 | Klein ................ B60G 5/047 |
| 11,597,246 | B1 | * | 3/2023 | Klein ................ B60G 11/465 |
| 2007/0040347 | A1 | * | 2/2007 | Fenton ................ B60G 11/12 280/686 |
| 2007/0063488 | A1 | * | 3/2007 | Dunlap ................ B60G 11/12 280/682 |
| 2007/0145656 | A1 | * | 6/2007 | Svendsen ................ F16F 1/18 267/260 |
| 2008/0036182 | A1 | * | 2/2008 | Fenton ................ B60G 11/12 280/682 |
| 2011/0068524 | A1 | * | 3/2011 | McCarthy ............ B60G 11/12 267/265 |
| 2014/0117639 | A1 | * | 5/2014 | Ramsey ................ B60G 9/04 280/124.11 |
| 2015/0014951 | A1 | * | 1/2015 | McGuire ............ B60G 17/005 280/86.5 |
| 2015/0273941 | A1 | * | 10/2015 | Mater, Jr. ............ B60B 35/007 29/401.1 |
| 2021/0213796 | A1 | | 7/2021 | Mater, Jr. et al. |
| 2023/0034135 | A1 | * | 2/2023 | Galazin ................ B60G 11/04 |
| 2023/0060738 | A1 | | 3/2023 | Zawacki et al. |
| 2024/0051363 | A1 | * | 2/2024 | Mater, Jr. ............ B60G 11/02 |

FOREIGN PATENT DOCUMENTS

| | | | | |
|---|---|---|---|---|
| CN | 111319417 | A | * | 6/2020 |
| CN | 112406440 | A | | 2/2021 |
| CN | 114013234 | A | * | 2/2022 |
| GB | 2545229 | A | * | 6/2017 ............ B60G 11/02 |
| WO | WO-2018013659 | A1 | * | 1/2018 ............ B60G 11/04 |

* cited by examiner

TANDEM AXLE TRAILER SUSPENSION SYSTEM

FIELD

The present disclosure relates to a suspension system, and more specifically, a tandem axle trailer suspension system.

BACKGROUND

This section provides background information related to the present disclosure and is not necessarily prior art.

A vehicle may be used to tow a trailer. The trailer may be attached to a rear end of the vehicle. More specifically, the vehicle may include a trailer hitch disposed at the rear end of the vehicle and the trailer may include a coupler disposed at a front end of the trailer. The coupler of the trailer can be connected to the trailer hitch of the vehicle to allow the vehicle to tow the trailer. While being towed by the vehicle, some trailers may tend to pull in a lateral direction relative to the vehicle, causing disproportionate wear on one or more tires of the trailer. Additionally, the trailer may experience roughness from the road and may transmit bumps and shocks to the vehicle, resulting in poor ride quality. The present disclosure provides a tandem axle trailer suspension that improves tire alignment and ride quality of the trailer for an improved towing experience.

SUMMARY

This section provides a general summary of the disclosure and is not a comprehensive disclosure of its full scope or all of its features.

In one form, the present disclosure provides a trailer that includes a trailer frame and a trailer suspension. The trailer suspension includes a first suspension assembly mounted to the trailer frame, a second suspension assembly mounted to the trailer frame, and a pair of axles extending between the first and second suspension assemblies. Each of the first and second suspension assemblies includes a first spring including a first spring end and a second spring end, and a second spring including a third spring end and a fourth spring end. The first springs of the first and second suspension assemblies support a first one of the pair of axles, and the second springs of the first and second suspension assemblies support a second one of the pair of axles. The second spring end of the first spring is positioned adjacent to the third spring end of the second spring, and the second and third spring ends are disposed between the first and fourth spring ends. The second spring end of the first spring is rotatable about a first rotational axis that is fixed relative to the trailer frame. The third spring end of the second spring is rotatable about a second rotational axis that is fixed relative to the trailer frame. The first spring end of the first spring and the fourth spring end of the second spring are movable relative to the trailer frame.

In some configurations of the trailer of the above paragraph, the second spring end of the first spring includes a first eye-end connector, and the first eye-end connector has a first aperture that is aligned with the first rotational axis. The third spring end of the second spring includes a second eye-end connector, and the second eye-end connector has a second aperture that is aligned with the second rotational axis.

In some configurations of the trailer of any one or more of the above paragraphs, the first and second suspension assemblies include a location bracket. The location bracket includes a top wall fixedly mounted to the trailer frame and opposing sidewalls that extend from the top wall. The first and second eye-end connectors are positioned between and rotatably attached to the sidewalls of the location bracket.

In some configurations of the trailer of any one or more of the above paragraphs, the first and second suspension assemblies includes a first location bracket and a second location bracket. The first and second location brackets include a top wall fixedly mounted to the trailer frame and opposing sidewalls that extend from the top wall. The first eye-end connector is positioned between and rotatably attached to the sidewalls of the first location bracket and the second eye-end connector is positioned between and rotatably attached to the sidewalls of the second location bracket.

In some configurations of the trailer of any one or more of the above paragraphs, the first and second suspension assemblies includes a first shackle link and a second shackle link. The first shackle link includes a first link end that is rotatably attached to the trailer frame and a second link end that is rotatably attached to the first spring end of the first spring. The second shackle link includes a third link end that is rotatably attached to the trailer frame and a fourth link end that is rotatably attached to the fourth spring end of the second spring.

In some configurations of the trailer of any one or more of the above paragraphs, the first and second suspension assemblies includes a first mechanical fastener and a second mechanical fastener. The first mechanical fastener extends through the second link end of the first shackle link and the first spring end of the first spring. The first spring end is rotatable about a third rotational axis that is axially aligned with the first mechanical fastener. The second mechanical fastener extends through the fourth link end of the second shackle link and the fourth spring end of the second spring. The fourth spring end is rotatable about a fourth rotational axis that is axially aligned with the second mechanical fastener.

In some configurations of the trailer of any one or more of the above paragraphs, the first and second suspension assemblies includes a first slipper mount and a second slipper mount. The first spring end of the first spring is slidably received in the first slipper mount and the fourth spring end of the second spring is slidably received in the second slipper mount.

In some configurations of the trailer of any one or more of the above paragraphs, the first and second slipper mounts include a top wall fixedly mounted to the trailer frame and opposing sidewalls that extend from the top wall. The first spring end of the first spring is positioned between the sidewalls of the first slipper mount and the fourth spring end of the second spring is positioned between the sidewalls of the second slipper mount.

In some configurations of the trailer of any one or more of the above paragraphs, a first mechanical fastener and a second mechanical fastener extends through the opposing sidewalls of each of the first and second slipper mounts. The first spring end of the first spring is positioned between the first and second mechanical fasteners of the first slipper mount and is slidably movable relative to the first and second mechanical fasteners of the first slipper mount. The fourth spring end of the second spring is positioned between the first and second mechanical fasteners of the second slipper mount and is slidably movable relative to the first and second mechanical fasteners of the second slipper mount.

In some configurations of the trailer of any one or more of the above paragraphs, the first spring end of the first spring and the fourth spring end of the second spring include a slip-end connector, and the slip-end connector is a lip formed in a curved shape.

In another form, the present disclosure provides a trailer suspension system that includes a first spring and a second spring. The first spring includes a first spring end and a second spring end. The second spring includes a third spring end and a fourth spring end. The second spring end of the first spring is positioned adjacent to the third spring end of the second spring, and the second and third spring ends are disposed between the first and fourth spring ends. The second spring end of the first spring is rotatable about a first rotational axis and the third spring end of the second spring is rotatable about a second rotational axis. The first and second rotational axes are fixed relative to each other, and the first spring end of the first spring and the fourth spring end of the second spring are movable relative to the first and second rotational axes.

In some configurations of the trailer suspension system of the above paragraph, the second spring end of the first spring includes a first eye-end connector, and the first eye-end connector has a first aperture that is aligned with the first rotational axis. The third spring end of the second spring includes a second eye-end connector, and the second eye-end connector has a second aperture that is aligned with the second rotational axis.

In some configurations of the trailer suspension system of any one of more of the above paragraphs, the trailer suspension system includes a location bracket that has a top wall and opposing sidewalls that extend from the top wall. The first and second eye-end connectors are positioned between and rotatably attached to the sidewalls of the location bracket.

In some configurations of the trailer suspension system of any one of more of the above paragraphs, the trailer suspension system includes a first location bracket and a second location bracket that have a top wall and opposing sidewalls that extend from the top wall. The first eye-end connector is positioned between and is rotatably attached to the sidewalls of the first location bracket and the second eye-end connector is positioned between and rotatably attached to the sidewalls of the second location bracket.

In some configurations of the trailer suspension system of any one of more of the above paragraphs, the trailer suspension system includes a first shackle link and a second shackle link. The first shackle link includes a first link end and a second link end that is rotatably attached to the first spring end of the first spring. The second shackle link includes a third link end and fourth link end that is rotatably attached to the fourth spring end of the second spring.

In some configurations of the trailer suspension system of any one of more of the above paragraphs, a first mechanical fastener extends through the second link end of the first shackle link and the first spring end of the first spring. The first spring end is rotatable about a third rotational axis that is axially aligned with first mechanical fastener. A second mechanical fastener extends through the fourth link end of the second shackle link and the fourth spring end of the second spring. The fourth spring end is rotatable about a fourth rotational axis that is axially aligned with the second mechanical fastener. The third and fourth rotational axes are movable relative to the first and second rotational axes.

In some configurations of the trailer suspension system of any one of more of the above paragraphs, the trailer suspension system includes a first slipper mount and a second slipper mount. The first slipper mount receives the first spring end of the first spring. The second slipper mount receives the fourth spring end of the second spring. The first spring end of the first spring is slidably movable relative to the first slipper mount and the fourth spring end of the second spring is slidably movable relative to the second slipper mount.

In some configurations of the trailer suspension system of any one of more of the above paragraphs, the first and second slipper mounts include a top wall and opposing sidewalls that extend from the top wall. The first spring end of the first spring is positioned between the sidewalls of the first slipper mount and the fourth spring end of the second spring is positioned between the sidewalls of the second slipper mount.

In some configurations of the trailer suspension system of any one of more of the above paragraphs, a first mechanical fastener and a second mechanical fastener extends through each of the first and second slipper mounts. The first spring end of the first spring is positioned between the first and second mechanical fasteners of the first slipper mount and is slidably movable relative to the first and second mechanical fasteners of the first slipper mount. The fourth spring end of the second spring is positioned between the first and second mechanical fasteners of the second slipper mount and is slidably movable relative to the first and second mechanical fasteners of the second slipper mount.

In some configurations of the trailer suspension system of any one of more of the above paragraphs, the first spring end of the first spring and the fourth spring end of the second spring include a slip-end connector. The slip-end connector is a lip formed in a curved shape.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

DETAILED DESCRIPTION

Figure 1:
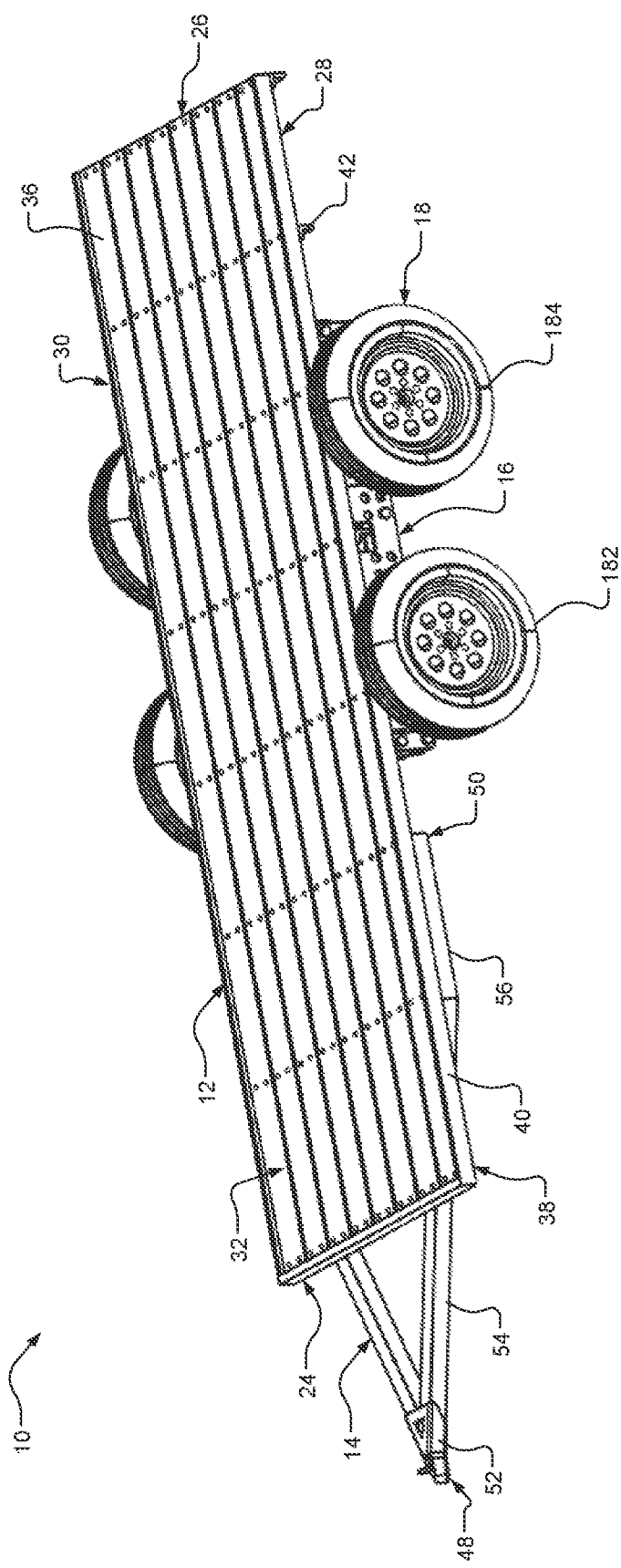
FIG. 1 is a perspective view of a trailer having a trailer suspension system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-5, a trailer 10 is provided that may include a trailer bed 12, a trailer connecting beam 14, a trailer suspension system 16, and a set of wheels 18. In the illustrated example, the trailer 10 is a flatbed type trailer. However, the trailer 10 may be another type of trailer, such as an enclosed trailer or a dump trailer. The trailer 10 may be attached to a vehicle to allow the vehicle to tow the trailer.

Figure 2:
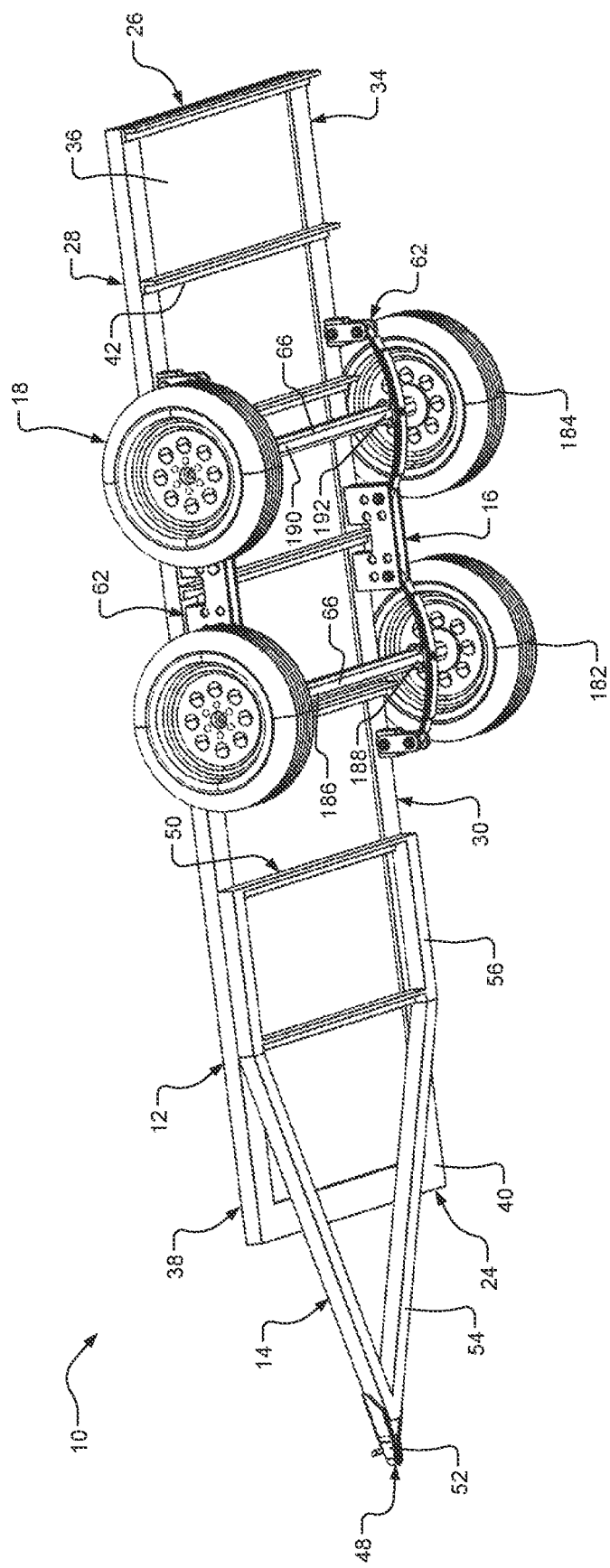
FIG. 2 is another perspective view of the trailer of FIG. 1.

As shown in FIGS. 1-2, the trailer bed 12 may include a front end 24 and a rear end 26 that is opposite to the front end 24. The trailer bed 12 may include a first lateral side 28 and a second lateral side 30 that is opposite to the first lateral side 28. The trailer bed 12 may include a top side 32 (FIG. 1) and a bottom side 34 (FIG. 2) that is opposite to the top side 32. The trailer bed 12 may include a trailer platform 36 that is disposed at the top side 32 and a trailer frame 38 that is disposed at the bottom side 34 and supports the trailer platform 36. In some examples, the trailer bed 12 may include railings and/or walls that extend from the trailer platform and cooperate to define an enclosed or partially enclosed space. The trailer frame 38 may include a support frame 40 and a plurality of beams 42. The support frame 40 may extend around a perimeter of the trailer platform 36. The plurality of beams 42 may each extend between the first and second lateral sides 28, 30 of the trailer bed 12. In the illustrated example, the plurality of beams 42 includes five beams. However, the plurality of beams 42 may include any suitable number of beams.

The trailer connecting beam 14 may be disposed at the front end 24 of the trailer bed 12. The trailer connecting beam 14 may include a front end 48 and a rear end 50 that is opposite to the front end 48. A coupler 52 may be disposed at the front end 48 of the trailer connecting beam 14. The coupler 52 can be removably coupled to a trailer hitch (including, for example, a trailer ball and ball mount) of the vehicle. The rear end 50 of the trailer connecting beam 14 may be attached to the trailer frame 38 at the bottom side 34 of the trailer bed 12. The trailer connecting beam 14 extends outwardly from the trailer bed 12 and more specifically, outwardly from the front end 24 of the trailer bed 12. The trailer connecting beam 14 may include a first portion 54 and a second portion 56. The first portion 54 may have a triangular shape and may be disposed at the front end 48 of the trailer connecting beam 14. The first portion 54 may be disposed at least partially forward of the front end 24 of the trailer bed 12. The second portion 56 may have a rectangular shape and may be disposed at the rear end 50 of the trailer connecting beam 14. The second portion 56 may be disposed below the trailer bed 12. However, the trailer connecting beam 14 may have another suitable shape and another suitable arrangement.

As shown in FIG. 2, the trailer suspension system 16 may be disposed at the bottom side 34 of the trailer bed 12 and may be mounted to the trailer frame 38. The trailer suspension system 16 may be positioned between the front end 24 and the rear end 26 of the trailer bed 12. More specifically, the trailer suspension system 16 may be positioned between the rear end 50 of the trailer connecting beam 14 and the rear end 26 of the trailer bed 12.

The trailer suspension system 16 may include a plurality of suspension assemblies 62 and a plurality of axles 66. A first one of the suspension assemblies 62 may be disposed at the first lateral side 28 of the trailer bed 12. A second one of the suspension assemblies 62 may be disposed at the second lateral side 30 of the trailer bed 12. The axles 66 may each extend between the first and second ones of the plurality of suspension assemblies 62. The wheels 18 are mounted on the axles 66. In the illustrated example, the trailer suspension system 16 supports the two axles 66 and four wheels 18. However, the trailer suspension system 16 may be configured to support any suitable number of axles 66 and any suitable number of wheels 18.

Figure 3:
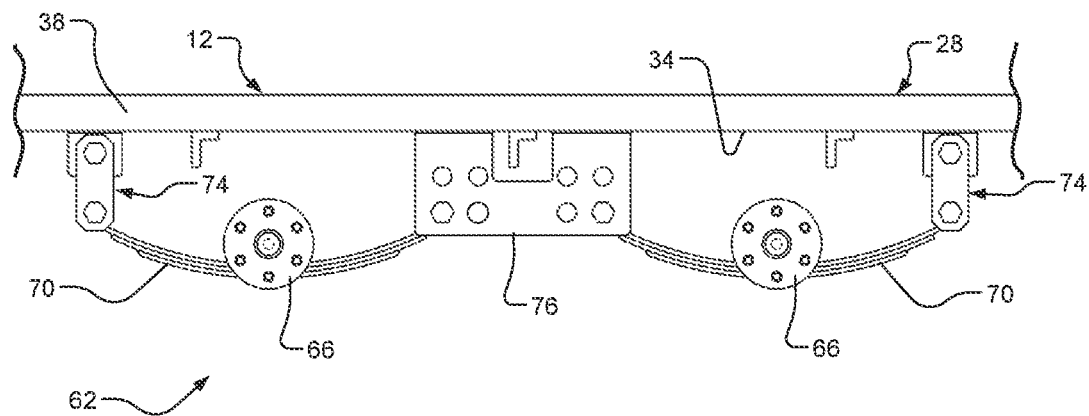
FIG. 3 is a side view of a portion of the trailer including the trailer suspension system.
Figure 4:
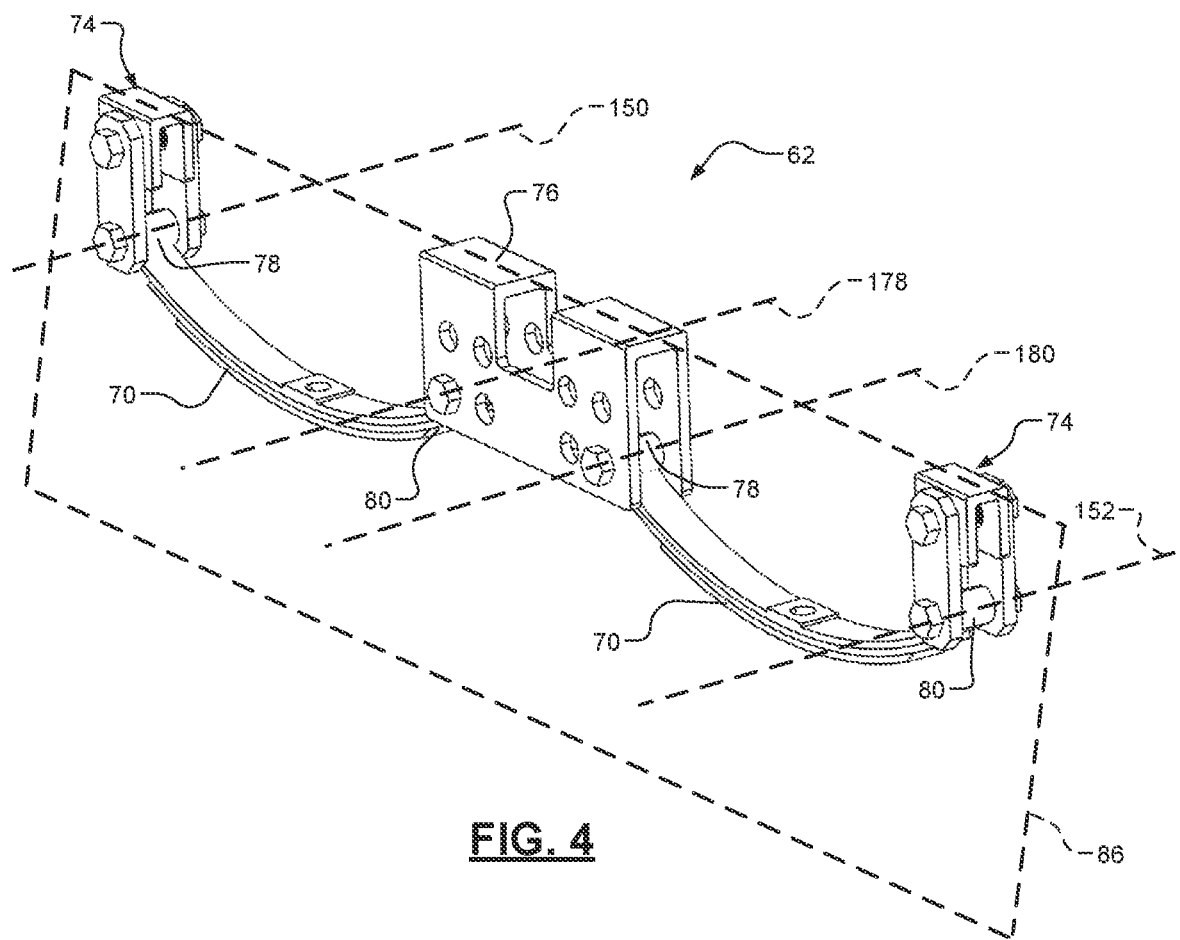
FIG. 4 is a perspective view of the trailer suspension system.

As shown in FIGS. 3-4, each of the suspension assemblies 62 may include a plurality of springs 70, a plurality of shackle link assemblies 74, and a location bracket 76. Each of the springs 70 may include a first spring end 78 and a second spring end 80 that is opposite to the first spring end 78. A first one of the springs 70 and a second one of the springs 70 may be arranged in tandem. In other words, the second spring end 80 of the first one of the springs 70 may be positioned adjacent to the first spring end 78 of the second one of the springs 70. The first and second ones of the springs 70 may be aligned along a plane 86. The plane 86 may be in parallel with and extend through the respective lateral side 28, 30 of the trailer bed 12. In other words, the first and second ones of the springs 70 may be laterally aligned with the respective lateral side 28, 30 of the trailer bed 12.

The first spring end 78 of the first one of the springs 70 may be attached to the trailer frame 38 using a first one of the plurality of shackle link assemblies 74. The second spring end 80 of the first one of the springs 70 and the first spring end 78 of the second one of the springs 70 may be attached to the trailer frame 38 using the location bracket 76. The second spring end 80 of the second one of the springs 70 may be attached to the trailer frame 38 using a second one of the plurality of shackle link assemblies 74.

Figure 5:
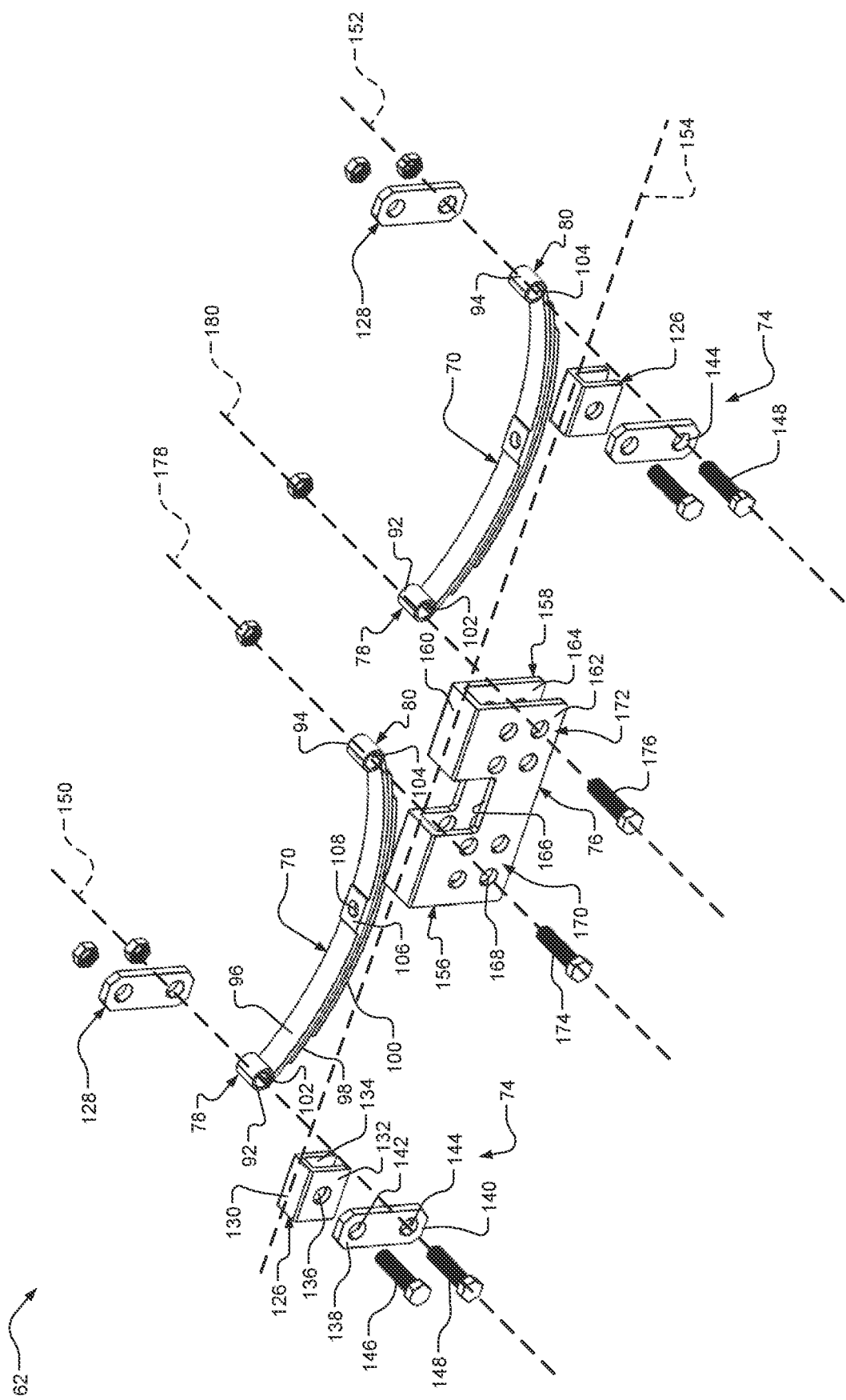
FIG. 5 is an exploded view of the trailer suspension system.

As shown in FIG. 5, each of the springs 70 may include a leaf spring stack having a first leaf spring 96, a second leaf spring 98, and a third leaf spring 100. While the leaf spring stacks of the springs 70 are shown in the figures having three leaf springs, in other configurations, the leaf spring stacks could have any number of leaf springs. The leaf springs 96, 98, 100 of the spring 70 can be attached to each other (in a stacked configuration) and a corresponding one of the axles 66. The first leaf spring 96 may include a first connector 92 and a second connector 94. The first and second connectors 92, 94 may be eye-end connectors. For example, the connectors 92, 94 can be formed by rolling the opposing ends of the first leaf spring 96 into cylinders with apertures 102, 104.

The first leaf spring 96 may have a first length extending from the first connector 92 to the second connector 94. The second leaf spring 98 may be disposed below the first leaf spring 96. The second leaf spring 98 may have a second length measured between opposing ends of the second leaf spring 98. The second length may be less than the first length. The third leaf spring 100 may be disposed below the second leaf spring 98. The third leaf spring 100 may have a third length measured between opposing ends of the third leaf spring 100. The third length may be less than the second length. The spring 70 may be formed in a curved shape, as illustrated, or another suitable shape.

A support plate 106 (FIG. 5) may be attached to the first leaf spring 96 and positioned opposite to the second leaf spring 98. An aperture 108 may extend transversely through the support plate 106 and the first, second, and third leaf springs 96, 98, 100 of the spring 70. The aperture 108 may be positioned equidistantly between the first spring end 78 and the second spring end 80 of the spring 70. A mechanical fastener (e.g., bolt, screw, rivets, etc.) may extend through the aperture 108 of the spring 70 and the corresponding one of the axles 66. In some examples, a retaining bracket may be wrapped around the corresponding one of the axles 66 and the spring 70 to further secure the first one of the axles 66 and the spring 70 together. It will be appreciated that the axles 66 can be secured to the springs 70 in any suitable manner.

With continued reference to FIGS. 3-5, the plurality of shackle link assemblies 74 may be attached to the trailer frame 38 and spaced apart along the respective lateral side 28, 30 of the trailer bed 12. A first one of the plurality of shackle link assemblies 74 may be attached to the first connector 92 of the first one of the springs 70. A second one of the plurality of shackle link assemblies 74 may be attached to the second connector 94 of the second one of the springs 70.

Each shackle link assemblies 74 may include a mount 126 and a pair of links 128. The mount 126 may be fixedly attached to the trailer frame 38. In some examples, the mount 126 may be integrally formed with the trailer frame 38. The mount 126 may include a top wall 130, a first sidewall 132, and a second sidewall 134. The top wall 130 of the mount 126 may be secured to the trailer frame 38. The first and second sidewalls 132, 134 may extend from opposing lateral sides of the top wall 130 such that the top wall 130, the first sidewall 132, and the second sidewall 134 cooperate to define a U-shape. The first sidewall 132 may be positioned outboard of the second sidewall 134. An aperture 136 may extend through the first and second sidewalls 132, 134 of the mount 126.

Each of the links 128 may be attached to a respective one of the sidewalls 132, 134 of the mount 126. For example, a first one of the links 128 may be positioned outboard of the mount 126 and attached to the first sidewall 132 of the mount 126. A second one of the links 128 may be positioned inboard of the mount 126 and attached to the second sidewall 134 of the mount 126. Each of the pair of links 128 may include a first end 138 (i.e., first link end) and a second end 140 (i.e., second link end) that is opposite to the first end 138. A first aperture 142 extends through the first end 138 and a second aperture 144 extends through the second end 140 of the pair of links 128. The first aperture 142 may be aligned with the aperture 136 of the mount 126. The first ends 138 of the links 128 may be attached to the mount 126 using a first mechanical fastener 146 (e.g., bolt, screw, rivets, etc.). More specifically, the first mechanical fastener 146 may extend through the first aperture 142 of the first one of the links 128, the aperture 136 of the mount 126, and the first aperture 142 of the second one of the links 128. The first end 138 of the link 128 is rotatably movable about the first mechanical fastener 146, relative to the mount 126.

The second aperture 144 may be aligned with the respective connector 92, 94 of the springs 70. The second ends 140 of each of the pair of links 128 may be attached to the spring 70 using a second mechanical fastener 148 (e.g., bolt, screw, rivets, etc.). The second mechanical fastener 148 may extend through the second apertures 144 of the links 128 and the respective aperture 102, 104 of the connectors 92, 94. More specifically, the first spring end 78 of the first one of the springs 70 may be rotatably movable relative to pair of links 128 about a first rotational axis 150. The first rotational axis 150 extends axially through the first connector 92 of the first one of the springs 70 and the second mechanical fastener 148. The first rotational axis 150, and thus the first spring end 78 of the first one of the springs 70, is movable relative to the trailer frame 38 upon rotatable movement of the pair of links 128. The second spring end 80 of the second one of the springs 70 may be rotatably movable relative to pair of links 128 about a second rotational axis 152. The second rotational axis 152 extends axially through the second connector 94 and the second mechanical fastener 148. The second rotational axis 152, and thus the second spring end 80 of the second one of the springs 70, is movable relative to the trailer frame 38 upon rotatable movement of the pair of links 128.

With continued reference to FIGS. 3-5, the location bracket 76 may be disposed equidistantly between the shackle link assemblies 74. The location bracket 76 may be aligned with each of the shackle link assemblies 74 along a second axis 154. The axis 154 may be disposed on the plane 86. The location bracket 76 may be fixedly attached to the trailer frame 38. In some examples, the location bracket 76 may be integrally formed with the trailer frame 38. The location bracket 76 may include a front end 156 and a rear end 158 that is opposite to the front end 156. The location bracket 76 may include a top wall 160, a first sidewall 162, and a second sidewall 164. Each of the top wall 160, the first sidewall 162 and the second sidewall 164 may extend between the front and rear ends 156, 158. The top wall 160 of the location bracket 76 may be secured to the trailer frame 38. The first and second sidewalls 162, 164 of the location bracket 76 may extend from opposing lateral sides of the top wall 160 such that the top wall 160, the first sidewall 162, and the second sidewall 164 cooperate to define a U-shape. The first sidewall 162 may be positioned outboard of the second sidewall 164. A recess 166 may be disposed in the location bracket 76 that extends from the top wall 160 and into first and second sidewalls 162, 164. The recess 166 may be sized, shaped, and positioned such that one of the plurality of beams 42 (FIG. 2) of the trailer frame 38 extends through the recess 166.

Each of the first sidewall 162 and the second sidewall 164 of the location bracket 76 may include a plurality of apertures 168. Each of the plurality of apertures 168 of the first sidewall 162 may be aligned with a respective one of the plurality of apertures 168 of the second sidewall 164. In the illustrated example, each of the plurality of apertures may include a first set 170 of the plurality of apertures 168 and a second set 172 of the plurality of apertures 168. The first set 170 may be disposed between the front end 156 of the location bracket 76 and the recess 166. The second set 172 may be disposed between the recess 166 and the rear end 158 of the location bracket 76. The first and second sets 170, 172 may be spaced apart from each other. Each of the first and second sets 170, 172 may include four apertures that are arranged in a two-by-two matrix. However, the plurality of apertures 168 may include any suitable number of apertures and have another suitable arrangement.

The second spring end 80 of the first one of the springs 70 and the first spring end 78 of the second one of the springs 70 may be received within and attached to the location bracket 76. The second spring end 80 of the first one of the springs 70 may be disposed between the first and second sidewalls 162, 164 of the location bracket 76 and positioned near the front end 156 of the location bracket 76. The second spring end 80 of the first one of the springs 70 may be attached to the location bracket 76 using a first mechanical fastener 174 (e.g., bolt, screw, rivets, etc.). The first mechanical fastener 174 may extend through one of the plurality of apertures 168 of the first sidewall 162 of the location bracket 76, the second aperture 104 of the second connector 94 of the first one of the springs 70, and one of the plurality of apertures 168 of the second sidewall 164 of the location bracket 76. The second spring end 80 of the first one of the springs 70 may be rotatably movable about a rotational axis 178. The rotational axis 178 extends axially through the second connector 94 and the first mechanical fastener 174. The rotational axis 178 may be fixed relative to the location bracket 76 and the trailer frame 38. More specifically, the second spring end 80 of the first one of the springs 70 may be restricted from horizontal movement (e.g., movement along an axis between the front and rear ends 24, 26 of the trailer bed 12), lateral movement (e.g., movement along an axis between the first and second lateral sides 28, 30 of the trailer bed 12), and vertical movement (e.g., movement along an axis between the top and bottom sides 32, 34 of the trailer bed 12) relative to the trailer frame 38.

The first spring end 78 of the second one of the springs 70 may be disposed between the first and second sidewalls 162, 164 of the location bracket 76 and may be positioned near the rear end 158 of the location bracket 76. The first spring end 82 of the second one of the springs 70 may be attached to the location bracket 76 using a second mechanical fastener 176 (e.g., bolt, screw, rivets, etc.). The second mechanical fastener 176 may extend through one of the plurality of apertures 168 of the first sidewall 162 of the location bracket 76, the first aperture 102 of the first connector 92 of the second one of the springs 70, and one of the plurality of apertures 168 of the second sidewall 164 of the location bracket 76. The first spring end 78 of the second one of the springs 70 may be rotatably movable about a rotational axis 180. The rotational axis 180 extends axially through the first connector 92 and the second mechanical fastener 176. The rotational axis 180 is fixed relative to the location bracket 76 and the trailer frame 38. More specifically, the first spring end 78 of the second one of the springs 70 may be restricted from horizontal movement (e.g., movement along an axis between the front and rear ends 24, 26 of the trailer bed 12), lateral movement (e.g., movement along an axis between the first and second lateral sides 28, 30 of the trailer bed 12), and vertical movement (e.g., movement along an axis between the top and bottom sides 32, 34 of the trailer bed 12) relative to the trailer frame 38.

Returning to FIGS. 1-2, the set of wheels 18 may include a pair of front wheels 182 and a pair of rear wheels 184. The front wheels 182 may be attached to opposing ends of the first one of the axles 66. More specifically, the first one of the axles 66 may include a first end 186 and a second end 188 that is opposite to the first end 186. The first end 186 of the first one of the axles 66 may be attached to the first one of the springs 70 of the first one of the suspension assemblies 62 and a first one of the front wheels 182. The second end 188 of the first one of the axles 66 may be attached to the first one of the springs 70 of the second one of the suspension assemblies 62 and a second one of the front wheels 182.

The rear wheels 184 are attached to opposing ends of the second one of the axles 66. More specifically, the second one of the axles 66 extends between a first end 190 and a second end 192 that is opposite to the first end 190. The first end 190 of the second one of the axles 66 may be attached to the second one of the springs 70 of the first one of the suspension assemblies 62 and a first one of the rear wheels 184. The second end 192 of the second one of the axles 66 may be attached to the second one of the springs 70 of the second one of the suspension assemblies 64 and a second one of the rear wheels 184.

Advantageously, the trailer suspension system 16 allows for the first one of the suspension assemblies 62 to be aligned with the first lateral side 28 of the trailer bed 12 and the second one of the suspension assemblies 62 to be aligned with the second lateral side 30 of the trailer bed 12. More specifically, the location bracket 76 provides for fixed mounting locations for the second spring end 80 of the first one of the springs 70 and the first spring end 78 of the second one of the springs 70. By positioning the springs 70 between the first and second sidewalls 162, 164 of the location bracket 76 and mounting the springs 70 to one of the fixed mounting locations, the first and second ones of the springs 70 are aligned to the plane 86. Alignment of the first and second ones of the springs 70 to the plane 86 allows for the pair of axles 66 and thus the set of wheels 18 to be aligned. Accordingly, the trailer 10 does not sway or pull to one lateral direction relative the vehicle that is towing the trailer 10.

Additionally, by mounting the first and second ones of the springs 70 to the location bracket 76, the first one of the springs 70 is independent of the second one of the springs 70. In other words, movement of the first one of the springs 70 does not drive movement to the second one of the springs 70 (and vice versa) since the location bracket 76 does not transmit movement or deflection of one of the springs 70 to the other of the springs 70. When one of the front and rear wheels 182, 184 of the trailer 10 overcomes an obstacle (e.g., bump, pothole, object, etc.) in a road, the corresponding spring 70 dampens the movement of the respective wheel 182, 184 without causing the trailer bed 12 to rock (e.g., front end 24 of the trailer bed 12 lowers and the rear end 26 raises, and vice versa). Accordingly, the coupler 52 of the trailer 10 does not forcefully contact the trailer hitch of the vehicle when the trailer overcomes the obstacle. This provides the trailer 10 with an improved ride quality and eliminates the need for additional shock absorbers or other dampening devices.

Figure 6:
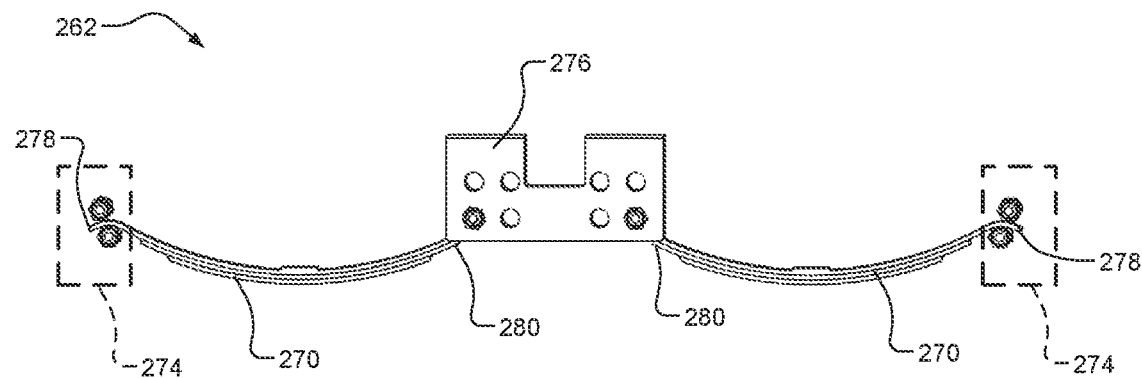
FIG. 6 is a side view of an alternative trailer suspension system according to the principles of the present disclosure.
Figure 7:
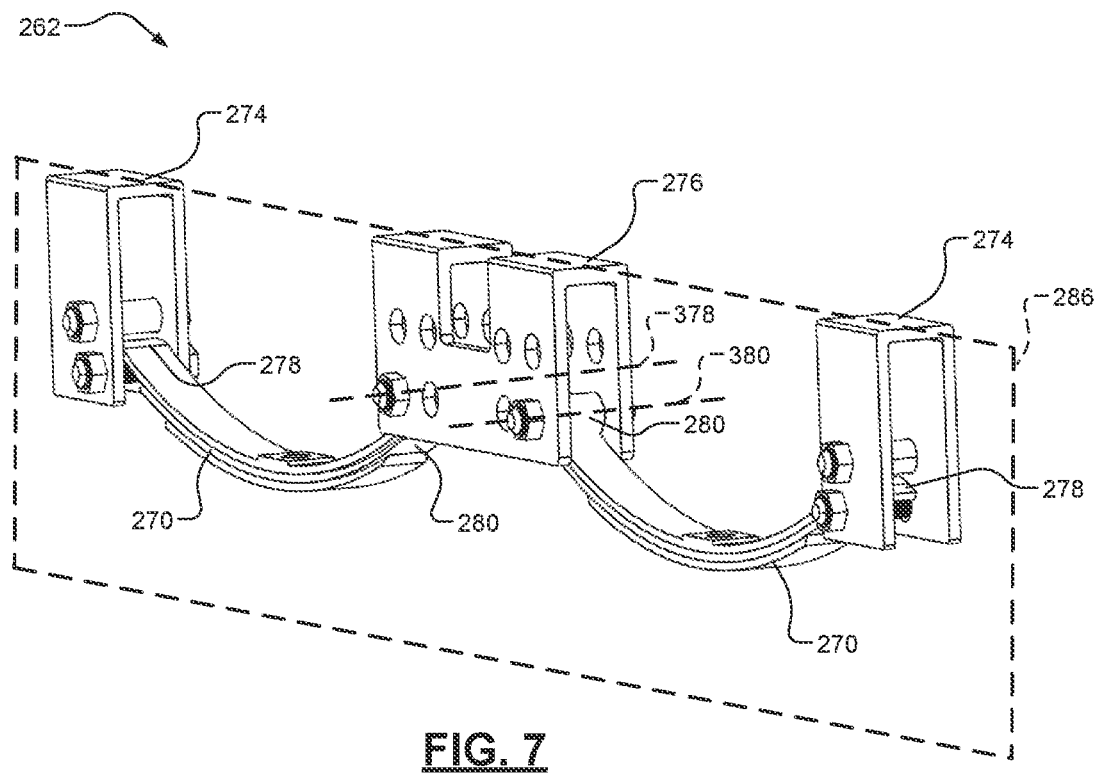
FIG. 7 is a perspective view of the trailer suspension system of FIG. 6.
Figure 8:
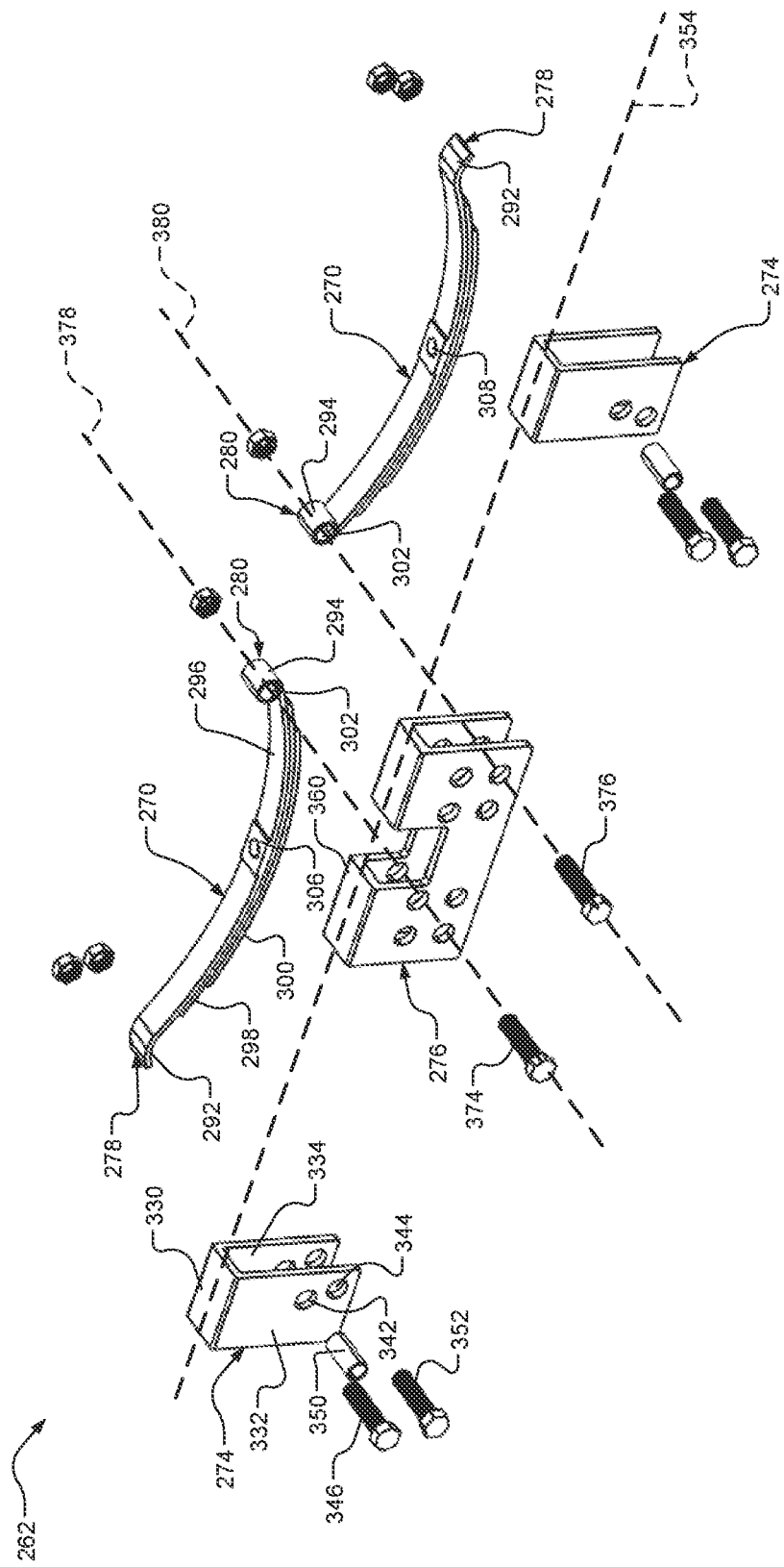
FIG. 8 is an exploded view of the trailer suspension system of FIGS. 6-7.

FIGS. 6-8 depict another example of one of the plurality of suspension assemblies 262 that can be incorporated into the trailer suspension system 16 of the trailer 10 instead of the plurality of suspension assemblies 62.

Each of the suspension assemblies 262 may include a plurality of springs 270, a plurality of slipper mounts 274, and a location bracket 276. The location bracket 276 is the same or substantially similar to the location bracket 76. Thus, the location bracket 276 will not be re-described in detail.

Each of the springs 270 may include a first spring end 278 and a second spring end 280 that is opposite to the first spring end 278. A first and second ones of the springs 270 may be arranged in tandem. More specifically, the second spring end 280 of the first one of the springs 270 may be positioned adjacent to the second spring end 280 of the second one of the springs 270. The first and second ones of the springs 272 may be aligned along a plane 286. The plane 286 may be in parallel with and extend through the respective lateral side 28, 30 of the trailer bed 12 (FIGS. 1-2).

The first spring ends 278 of the first and second one of the springs 270 may be attached to the trailer frame 38 using the slipper mounts 274. The second spring ends 280 of the first and second one of the springs 270 may be attached to the trailer frame 38 using the location bracket 276.

As shown in FIG. 8, each of the springs 270 may include a leaf spring stack having a first leaf spring 296, a second leaf spring 298, and a third leaf spring 300. While the leaf spring stacks of the springs 270 are shown in the figures having three leaf springs, in other configurations, the leaf spring stacks could have any number of leaf springs. The leaf springs 296, 298, 300 of the spring 270 can be attached to each other (in a stacked configuration) and a corresponding one of the axles 66 (FIGS. 2-3). The first leaf spring 296 may include a lip 292 and a connector 294. The lip 292 may define a slip-end connector. For example, the lip 292 can be formed by curling the first spring end 278 of the first leaf spring 296 such that the lip 292 is formed in a curved shape. The connector 294 may be an eye-end connector. For example, the connector 294 can be formed by rolling the second spring end 280 of the first leaf spring 296 into a cylinder with aperture 302.

The first leaf spring 296 may have a first length extending from the lip 292 to the connector 294. The second leaf spring 298 may be disposed below the first leaf spring 296. The second leaf spring 298 may have a second length measured between opposing ends of the second leaf spring 298. The second length may be less than the first length. The third leaf spring 300 may be disposed below the second leaf spring 298. The third leaf spring 300 may have a third length measured between opposing ends of the third leaf spring 300. The third length may be less than the second length. The spring 270 may be formed in a curved shape, as illustrated, or another suitable shape.

A support plate 306 may be attached to the first leaf spring 296 and positioned opposite to the second leaf spring 298. An aperture 308 may extend transversely through the support plate 306 and the first, second, and third leaf springs 296, 298, 300 of the spring 270. The aperture 308 may be positioned equidistantly between the first spring end 278 and the second spring end 280 of the spring 270. A mechanical fastener (e.g., bolt, screw, rivets, etc.) may extend through the aperture 308 of the spring 270 and the corresponding one of the axles 66. In some examples, a retaining bracket may be wrapped around the corresponding one of the axles 66 and the spring 270 to further secure the first one of the axles 66 and the spring 270 together. It will be appreciated that the axles 66 can be secured to the springs 270 in any suitable manner.

The plurality of slipper mounts 274 may be mounted to the trailer frame 38 and spaced apart along the respective lateral side 28, 30 of the trailer bed 12. A first one of the slipper mounts 274 may receive the lip 292 of the first one of the springs 270. A second one of the slipper mounts 274 may receive the lip 292 of the second one of the springs 270. Each of the slipper mounts 274 may include a top wall 330, a first sidewall 332, and a second sidewall 334. The top wall 330 may be fixedly mounted to the trailer frame 38. The first and second sidewalls 332, 334 may extend from opposing lateral sides of the top wall 330 such that the top wall 330, the first sidewall 332, and the second sidewall 334 cooperate to define a U-shape. The first sidewall 332 may be positioned outboard of the second sidewall 334. A first aperture 342 and a second aperture 344 may extend through the first and second sidewalls 332, 334 of the slipper mounts 274. A first mechanical fastener 346 (e.g., bolt, screw, rivets, etc.) may extend through the first aperture 342. In the illustrated example, a spacer 350 may be disposed between the first apertures 342 of the first and second sidewalls 332, 334. The first mechanical fastener 346 may extend through the spacer 350. A second mechanical fastener 352 (e.g., bolt, screw, rivets, etc.) may extend through the second apertures 344.

The lip 292 of the springs 270 may be disposed between the first and second mechanical fasteners 346, 352. The lip 292 may be slidably movable relative to the first and second mechanical fasteners 346, 352.

With continued reference to FIGS. 6-8, the location bracket 276 may be disposed equidistantly between the first and second ones of the slipper mounts 274. The location bracket 276 may be aligned with each of the slipper mounts 274 along a second axis 354. The second axis 354 may be disposed on the plane 286. The second spring ends 280 of the springs 270 may be received within and attached to the location bracket 276. More specifically, a first mechanical fastener 374 (e.g., bolt, screw, rivets, etc.) may extend through the connector 294 of the first one of the springs 270 and the location bracket 276. The second spring end 280 of the first one of the springs 270 may be rotatably movable about a rotational axis 378. The rotational axis 378 extends axially through the connector 294 of the first one of the springs 270 and the first mechanical fastener 374. The rotational axis 378 may be fixed relative to the location bracket 276 and the trailer frame 38. More specifically, the second spring end 280 of the first one of the springs 270 may be restricted from horizontal movement (e.g., movement along an axis between the front and rear ends 24, 26 of the trailer bed 12), lateral movement (e.g., movement along an axis between the first and second lateral sides 28, 30 of the trailer bed 12), and vertical movement (e.g., movement along an axis between the top and bottom sides 32, 34 of the trailer bed 12) relative to the trailer frame 38.

A second mechanical fastener 376 (e.g., bolt, screw, rivets, etc.) may extend through the connector 294 of the second one of the springs 270 and the location bracket 276. The second spring end 280 of the second one of the springs 270 may be rotatably movable about a rotational axis 380. The rotational axis 380 extends axially through the connector 294 of the second one of the springs 270 and the second mechanical fastener 374. The rotational axis 380 may be fixed relative to the location bracket 276 and the trailer frame 38. More specifically, the second spring end 280 of the second one of the springs 270 may be restricted from horizontal movement (e.g., movement along an axis between the front and rear ends 24, 26 of the trailer bed 12), lateral movement (e.g., movement along an axis between the first and second lateral sides 28, 30 of the trailer bed 12), and vertical movement (e.g., movement along an axis between the top and bottom sides 32, 34 of the trailer bed 12) relative to the trailer frame 38.

The advantages of ease of aligning the springs 270 and improved ride quality described with respect to the suspension assemblies 62 may also be applicable to the suspension assemblies 262.

Figure 9:
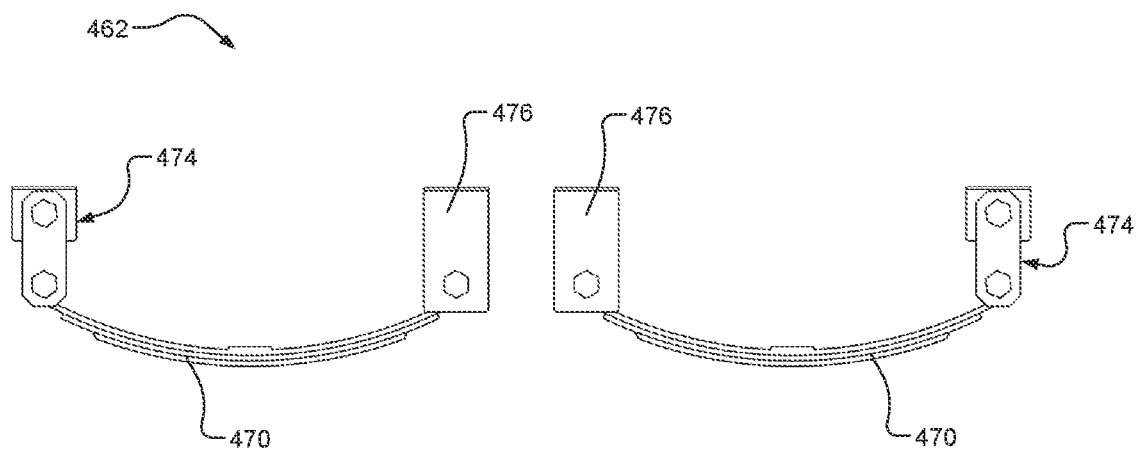
FIG. 9 is a side view of another alternative trailer suspension system according to the principles of the present disclosure.
Figure 10:
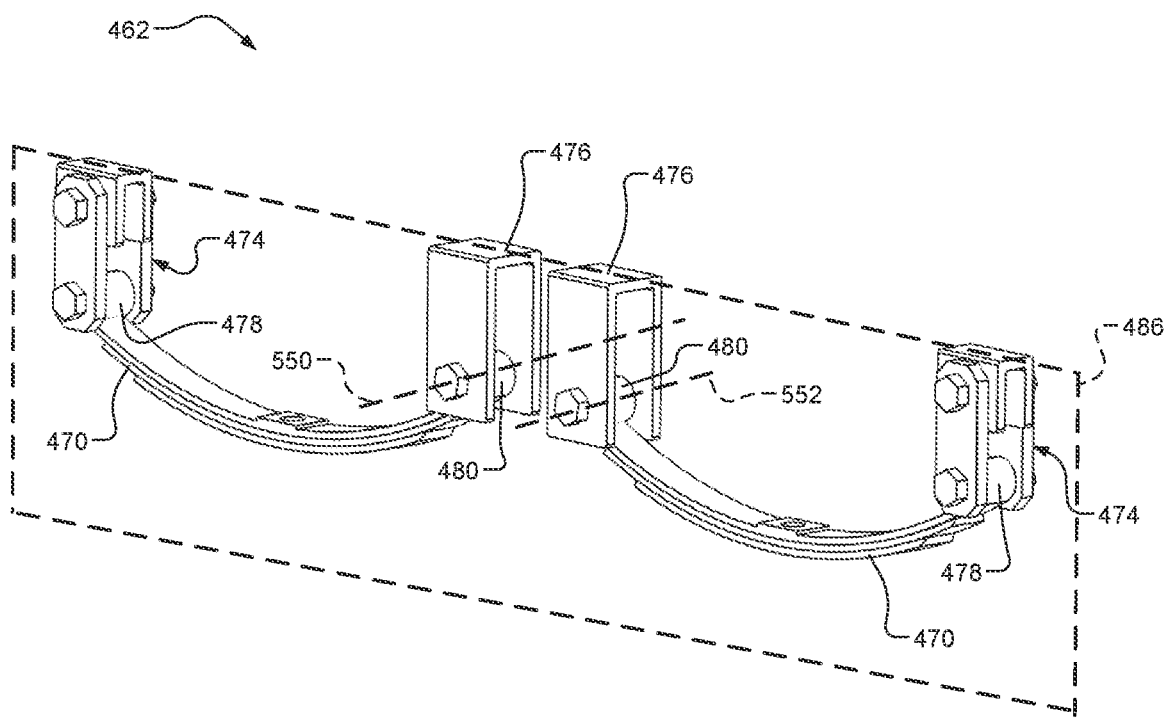
FIG. 10 is a perspective view of the trailer suspension system of FIG. 9.
Figure 11:
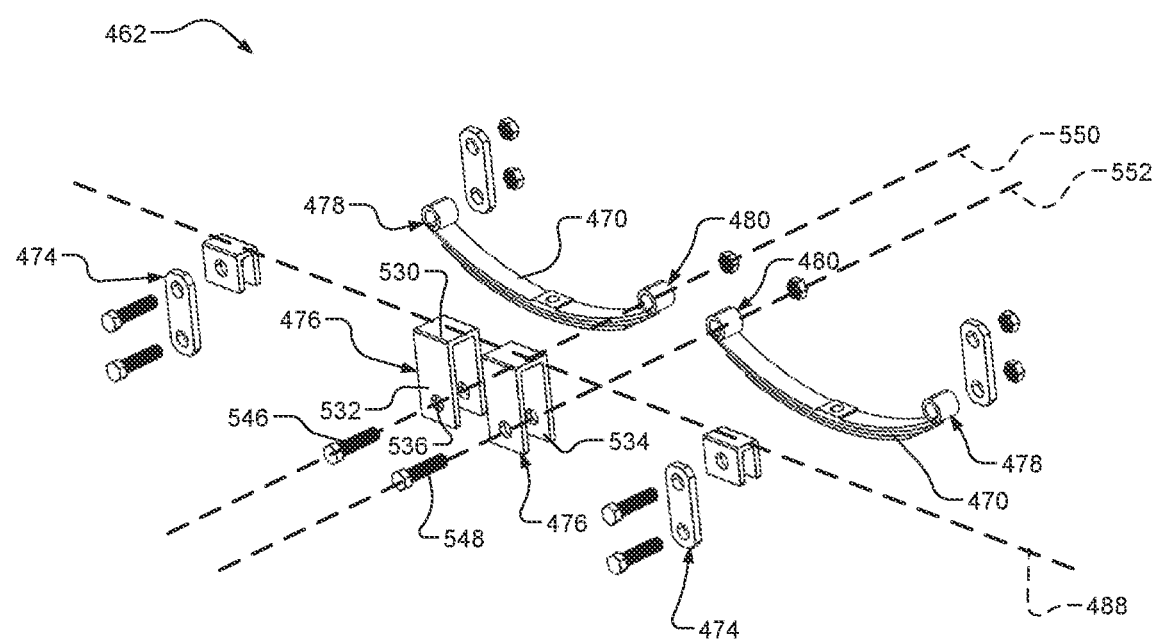
FIG. 11 is an exploded view of the trailer suspension system of FIGS. 9-10.

FIGS. 9-11 depict another example of one of the plurality of suspension assemblies 462 that can be incorporated into the trailer suspension system 16 of the trailer 10 instead of the plurality of suspension assemblies 62, 262.

Each of the suspension assemblies 462 may include a plurality of springs 470, a plurality of shackle link assemblies 474, and a plurality of location brackets 476. The plurality of springs 470 is the same or substantially similar to the plurality of spring 70 of the trailer suspension system 16. The plurality of shackle link assemblies 474 is the same or substantially similar to the pair of shackle link assemblies 74 of the trailer suspension system 16. Thus, the plurality of springs 470 and the plurality of shackle link assemblies 474 will not be re-described in detail.

The first and second ones of the springs 470 may be aligned along a plane 486. The plane 486 may be in parallel with and extend through the respective lateral side 28, 30 of the trailer bed 12 (FIGS. 1-2). The plurality of shackle link assemblies 474 and the plurality of location brackets 476 may be aligned along a second axis 488. A first spring end 478 of the springs 470 may be rotatably attached to one of the shackle link assemblies 474. A second spring end 480 of the springs 470 may be rotatably attached to the location brackets 476.

The plurality of location brackets 476 may be mounted to the trailer frame 38. A first one of the location brackets 476 may positioned adjacent to a second one of the location brackets 476. The location brackets 476 may be spaced apart along the axis 522. The second spring end 480 of a first one of the springs 470 may be attached to the first one of the location brackets 476. The second spring end 480 of a second one of the springs 470 may be attached to the second one of the location brackets 476.

Each of the location brackets 476 may include a top wall 530, a first sidewall 532, and a second sidewall 534. The top wall 530 of the location brackets 476 may be mounted to the trailer frame 38 (FIGS. 1-2). The first and second sidewalls 532, 534 of the location brackets 476 may extend from opposing lateral sides of the top wall 530 such that the top wall 530, the first sidewall 532, and the second sidewall 534 cooperate to define a U-shape. The first sidewall 532 may be positioned outboard of the second sidewall 534. An aperture 536 may extend through the first and second sidewalls 532, 534 of the location bracket 476. A first mechanical fastener 546 (e.g., bolt, screw, rivets, etc.) may extend through the aperture 536 of the first one of the location brackets 476 and the second spring end 480 of the first one of the springs 470. The second spring end 480 of the first one of the springs 470 may be rotatably movable about a first rotational axis 550. A second mechanical fastener 548 (e.g., bolt, screw, rivets, etc.) may extend through the aperture 536 of the second one of the location brackets 476 and the second spring end 480 of the second one of the springs 470. The second spring end 480 of the second one of the springs 470 may be rotatably movable about a second rotational axis 552. The rotational axes 550, 552 extends axially through the second spring ends 80 and the mechanical fasteners 546, 548, respectively. The rotational axes 550, 552 may be fixed relative to the location brackets 476 and the trailer frame 38. More specifically, the second spring ends 480 of the springs 470 may be restricted from horizontal movement (e.g., movement along an axis between the front and rear ends 24, 26 of the trailer bed 12), lateral movement (e.g., movement along an axis between the first and second lateral sides 28, 30 of the trailer bed 12), and vertical movement (e.g., movement along an axis between the top and bottom sides 32, 34 of the trailer bed 12) relative to the trailer frame 38.

The advantages of ease of aligning the springs 470 and improved ride quality described with respect to the suspension assemblies 62, 262 may also be applicable to the suspension assemblies 462.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A trailer comprising:
a trailer frame; and
a trailer suspension including a first suspension assembly mounted to the trailer frame, a second suspension assembly mounted to the trailer frame, and a pair of axles extending between the first and second suspension assemblies, wherein:
   each of the first and second suspension assemblies includes a first spring including a first spring end and a second spring end, and a second spring including a third spring end and a fourth spring end,
   the first springs of the first and second suspension assemblies support a first one of the pair of axles, and the second springs of the first and second suspension assemblies support a second one of the pair of axles,
   the second spring end of the first spring is spaced apart from the third spring end of the second spring in a fore-aft direction relative to the trailer frame, wherein the second and third spring ends are disposed between the first and fourth spring ends,
   the second spring end of the first spring is rotatable about a first rotational axis that is fixed relative to the trailer frame,
   the third spring end of the second spring is rotatable about a second rotational axis that is fixed relative to the trailer frame, and
   the first spring end of the first spring and the fourth spring end of the second spring are movable relative to the trailer frame.

2. The trailer of claim 1, wherein:
the second spring end of the first spring includes a first eye-end connector, wherein the first eye-end connector has a first aperture that is aligned with the first rotational axis, and
the third spring end of the second spring includes a second eye-end connector, wherein the second eye-end connector has a second aperture that is aligned with the second rotational axis.

3. The trailer of claim 2, wherein:
the first and second suspension assemblies include a location bracket,
the location bracket includes a top wall fixedly mounted to the trailer frame and opposing sidewalls that extend from the top wall, and
the first and second eye-end connectors are positioned between and rotatably attached to the sidewalls of the location bracket.

4. The trailer of claim 2, wherein:
the first and second suspension assemblies includes a first location bracket and a second location bracket,
the first and second location brackets include a top wall fixedly mounted to the trailer frame and opposing sidewalls that extend from the top wall, and
the first eye-end connector is positioned between and rotatably attached to the sidewalls of the first location bracket and the second eye-end connector is positioned between and rotatably attached to the sidewalls of the second location bracket.

5. The trailer of claim 1, wherein:
the first and second suspension assemblies includes a first shackle link and a second shackle link,
the first shackle link includes a first link end that is rotatably attached to the trailer frame and a second link end that is rotatably attached to the first spring end of the first spring, and
the second shackle link includes a third link end that is rotatably attached to the trailer frame and a fourth link end that is rotatably attached to the fourth spring end of the second spring.

6. The trailer of claim 5, wherein:
the first and second suspension assemblies includes a first mechanical fastener and a second mechanical fastener,
the first mechanical fastener extends through the second link end of the first shackle link and the first spring end of the first spring, wherein the first spring end is rotatable about a third rotational axis that is axially aligned with the first mechanical fastener,
the second mechanical fastener extends through the fourth link end of the second shackle link and the fourth spring end of the second spring, wherein the fourth spring end is rotatable about a fourth rotational axis that is axially aligned with the second mechanical fastener.

7. The trailer of claim 1, wherein:
the first and second suspension assemblies includes a first slipper mount and a second slipper mount, and
the first spring end of the first spring is slidably received in the first slipper mount and the fourth spring end of the second spring is slidably received in the second slipper mount.

8. The trailer of claim 7, wherein:
the first and second slipper mounts include a top wall that is fixedly mounted to the trailer frame and opposing sidewalls that extend from the top wall, and
the first spring end of the first spring is positioned between the sidewalls of the first slipper mount and the fourth spring end of the second spring is positioned between the sidewalls of the second slipper mount.

9. The trailer of claim 8, wherein:
a first mechanical fastener and a second mechanical fastener extends through the opposing sidewalls of each of the first and second slipper mounts,
the first spring end of the first spring is positioned between the first and second mechanical fasteners of the first slipper mount and is slidably movable relative to the first and second mechanical fasteners of the first slipper mount, and
the fourth spring end of the second spring is positioned between the first and second mechanical fasteners of the second slipper mount and is slidably movable relative to the first and second mechanical fasteners of the second slipper mount.

10. The trailer of claim 9, wherein:
the first spring end of the first spring and the fourth spring end of the second spring include a slip-end connector, and
the slip-end connector is a lip formed in a curved shape.

11. A trailer suspension system comprising:
a first spring including a first spring end and a second spring end; and
a second spring including a third spring end and a fourth spring end,
wherein:
   the second spring end of the first spring is positioned adjacent to the third spring end of the second spring, and the second and third spring ends are disposed between the first and fourth spring ends,
   the second spring end of the first spring is rotatable about a first rotational axis and the third spring end of the second spring is rotatable about a second rotational axis, and
   the first and second rotational axes are fixed relative to each other, and the first spring end of the first spring and the fourth spring end of the second spring are movable relative to the first and second rotational axes, the first end of the first spring is rotatable about a third rotational axis that is movable relative to the first rotational axis, and the fourth end of the second spring is rotatable about a fourth rotational axis that is movable relative to the second rotational axis.

12. The trailer suspension system of claim 11, wherein:
the second spring end of the first spring includes a first eye-end connector, wherein the first eye-end connector has a first aperture that is aligned with the first rotational axis, and
the third spring end of the second spring includes a second eye-end connector, wherein the second eye-end connector has a second aperture that is aligned with the second rotational axis.

13. The trailer suspension system of claim 12, further comprising:
a location bracket including a top wall and opposing sidewalls that extend from the top wall,
wherein the first and second eye-end connectors are positioned between and rotatably attached to the sidewalls of the location bracket.

14. The trailer suspension system of claim 12, further comprising:
a first location bracket and a second location bracket each including a top wall and opposing sidewalls that extend from the top wall,
wherein the first eye-end connector is positioned between and is rotatably attached to the sidewalls of the first location bracket and the second eye-end connector is positioned between and rotatably attached to the sidewalls of the second location bracket.

15. The trailer suspension system of claim 11, further comprising:
a first shackle link including a first link end and a second link end that is rotatably attached to the first spring end of the first spring; and
a second shackle link including a third link end and fourth link end that is rotatably attached to the fourth spring end of the second spring.

16. The trailer suspension system of claim 15, wherein:
a first mechanical fastener extends through the second link end of the first shackle link and the first spring end of the first spring, wherein the first spring end is rotatable about the third rotational axis that is axially aligned with the first mechanical fastener, and
a second mechanical fastener extends through the fourth link end of the second shackle link and the fourth spring end of the second spring, wherein the fourth spring end is rotatable about the fourth rotational axis that is axially aligned with the second mechanical fastener.

17. A trailer suspension system comprising:
a first spring including a first spring end and a second spring end;
a second spring including a third spring end and a fourth spring end;
a first slipper mount receiving the first spring end of the first spring; and
a second slipper mount receiving the fourth spring end of the second spring, wherein:
the second spring end of the first spring is positioned adjacent to the third spring end of the second spring, and the second and third spring ends are disposed between the first and fourth spring ends,
the second spring end of the first spring is rotatable about a first rotational axis, wherein the second spring end includes a first eye-end connector, and wherein the first eye-end connector has a first aperture that is aligned with the first rotational axis,
the third spring end of the second spring is rotatable about a second rotational axis, wherein the third spring end includes a second eye-end connector, and wherein the second eye-end connector has a second aperture that is aligned with the second rotational axis,
each of the first and the second slipper mounts include a top wall and opposing sidewalls that extend from the top wall,
a first mechanical fastener and a second mechanical fastener extend through each of the first and second slipper mounts,
the first spring end of the first spring is positioned between the sidewalls of the first slipper mount and between the first and second mechanical fasteners of the first slipper mount and the fourth spring end of the second spring is positioned between the sidewalls of the second slipper mount and between the first and second mechanical fasteners of the second slipper mount,
the first and second rotational axes are fixed relative to each other,
the first spring end of the first spring and the fourth spring end of the second spring are movable relative to the first and second rotational axes,
the first spring end is slidably movable relative to the first and second mechanical fasteners of the first slipper mount, and
the fourth spring end is slidably movable relative to the first and second mechanical fasteners of the second slipper mount.

18. The trailer suspension system of claim 17, wherein the first spring end of the first spring and the fourth spring end of the second spring each include a slip-end connector, wherein the slip-end connector is a lip formed in a curved shape.

19. The trailer suspension system of claim 17, further comprising:
a location bracket including a top wall and opposing sidewalls that extend from the top wall,
wherein the first and second eye-end connectors are positioned between and rotatably attached to the sidewalls of the location bracket.

20. The trailer suspension system of claim 17, further comprising:
a first location bracket and a second location bracket each including a top wall and opposing sidewalls that extend from the top wall,
wherein the first eye-end connector is positioned between and is rotatably attached to the sidewalls of the first location bracket and the second eye-end connector is positioned between and rotatably attached to the sidewalls of the second location bracket.

* * * * *